R. H. GARDNER.

IRONING APPARATUS.

No. 7,237. Reissued July 25, 1876.

WITNESSES:

C. Nereux

John Goetzals

INVENTOR:

R. H. Gardner

BY

ATTORNEYS.

N. PETERS, PHOTO-LITHOGRAPHER, WASHINGTON, D. C.

UNITED STATES PATENT OFFICE.

RICHARD H. GARDNER, OF TROY, NEW YORK, ASSIGNOR OF ONE-HALF INTEREST TO J. WRIGHT GARDNER.

IMPROVEMENT IN IRONING APPARATUS.

Specification forming part of Letters Patent No. 169,250, dated October 26, 1875; reissue No. 7,237, dated July 25, 1876; application filed June 3, 1876.

*To all whom it may concern:*

Figure 2:
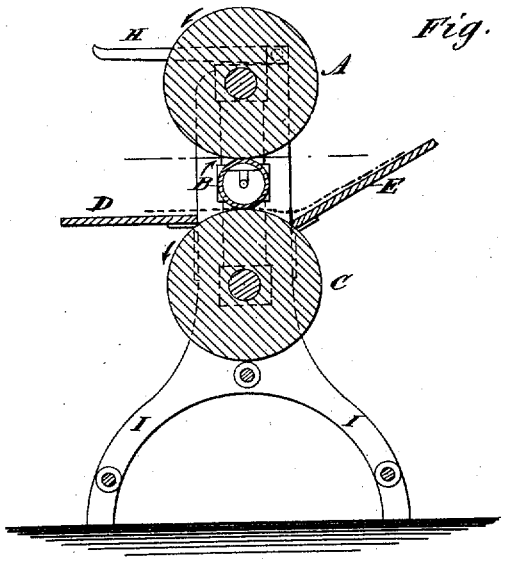
Figure 1:
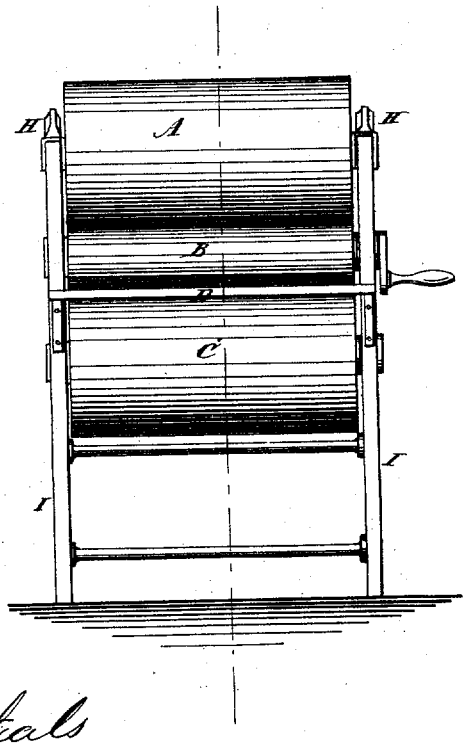

Be it known that I, RICHARD H. GARDNER, of Troy, in the county of Rensselaer and State of New York, have invented new and useful Improvements in Ironing-Machines, of which the following is a specification:

Figure 1 is a front elevation of the machine. Fig. 2 is a sectional elevation, showing sections of the three rolls, and the improvements therein.

Similar letters of reference indicate corresponding parts.

It is well known to laundrymen that at least two heats are required to properly dry and iron collars and cuffs. To effect this, they are, in the machines now in use, passed under two or more hot-rolls.

The object of this invention is to simplify the machine, and at the same time increase its capacity by a construction and arrangement of the rolls in such manner that both sides of the fabric will be ironed by the same heated roll, thereby reducing the number of rolls to three, and making it necessary to heat only one; also, to make it automatic to such an extent that the fabric, after once passing between the rolls, will return between the rolls to the operator without rehandling.

I is the frame, constructed in the usual manner. A and C are large rolls, covered with cloth or other suitable material, in the ordinary manner. Between these rolls is the roll B, heated by gas carried through the journals, or in any of the ordinary methods.

The rolls may be geared together at one or both ends, and the gearing so constructed and arranged that the rolls can be adjusted in such manner that they will revolve with equal rapidity, making no friction between the goods and the rolls, and producing what is known to the trade as the "domestic finish;" or the rolls can be so adjusted that they will revolve with unequal rapidity, thereby creating friction between the goods and the heated roll, and producing what is known to trade as a "gloss finish."

E is an inclined plane, made of wood or other material, and of same length as rolls. It is located behind the rolls, and with its lower edge so near the top of the roll C that the fabric passing out from between the rolls A and B will drop onto it, and slide down to and be caught between the rolls B and C, and thus be automatically reversed and repassed, so that both sides will be ironed by one heated roll.

D is an apron in front of the operator, and located parallel with and near the top of the roll C, upon which the collars or other goods are placed for ironing, and upon which they are deposited after passing between A and B, and returned between B and C.

H is a lever, upon which a weight is hung for obtaining the required pressure upon the rolls, the journals of one or more of which are movable in the frame; but the necessary pressure may be obtained in any other known method.

In operation, the article to be ironed is placed by the operator between the rolls A and B, and passes between them, and is ironed on its lower side by contact with the hot-roll roll B, dropping upon the incline E as it escapes from the rolls. It then immediately slides down the incline, and is caught by the rolls B and C, and carried back between them, with the upper side of the fabric in contact with the heated roll B, for being ironed. It then drops upon the apron in front of the operator, finished.

Thus it will be seen that, by this arrangement of the rolls, and the device for returning the goods, both sides of the article are ironed by the same heated roll without rehandling, which economizes time, labor, and fuel.

When it is desirable to iron the fabric on one side only, the incline plane may be removed or lowered, so that the fabric will not return automatically to the operator, but may be placed between the rolls B and C, with same side exposed to the heated roll B; or it may be so directed as to follow the heated roll one whole revolution, and then be removed by the operator.

Having thus described my invention, I claim as new and desire to secure by Letters Patent—

1. The heated roll B, arranged diametrically between the rolls A C, to iron both sides of the fabric, in the manner described.

2. The combination, with three rolls, A B C, of the rear inclined plane, by which the fabric is fed back to the machine after being ironed on one side.

3. The combination of the shelf or table D, the rolls A, B, and C, and the inclined table E, all arranged to operate substantially as described.

RICHARD H. GARDNER.

Witnesses:
PHILIP FITZPATRICK,
B. MAC GREGOR.